Dec. 30, 1969      G. STEULER      3,486,863
METHOD AND APPARATUS FOR MIXING FLOWABLE SUBSTANCES
Filed April 4, 1966      4 Sheets-Sheet 1

INVENTOR:
GEORG STEULER
BY Michael S. Striker
his ATTORNEY

Dec. 30, 1969    G. STEULER    3,486,863
METHOD AND APPARATUS FOR MIXING FLOWABLE SUBSTANCES
Filed April 4, 1966    4 Sheets-Sheet 3

INVENTOR:
GEORG STEULER
BY Michael S. Striker
his ATTORNEY

Dec. 30, 1969   G. STEULER   3,486,863
METHOD AND APPARATUS FOR MIXING FLOWABLE SUBSTANCES
Filed April 4, 1966   4 Sheets-Sheet 4

INVENTOR:
GEORG STEULER
BY *Michael S. Striker* his ATTORNEY

United States Patent Office
3,486,863
Patented Dec. 30, 1969

3,486,863
METHOD AND APPARATUS FOR MIXING FLOWABLE SUBSTANCES
Georg Steuler, Parkstrasse 15, Hoehr-Grenzhausen, Germany
Filed Apr. 4, 1966, Ser. No. 539,921
Claims priority, application Germany, Apr. 5, 1965, St 23,626
Int. Cl. B01f 1/14, 1/00
U.S. Cl. 23—285          12 Claims

ABSTRACT OF THE DISCLOSURE

An apparatus for intimately mixing a liquid substance with a flowable substance in which the substances to be mixed are simultaneously conveyed at high speed through a plurality of serially connected mixers having each a circular mixing chamber in such a manner so that the substances enter each mixing chamber in substantially tangential direction and leave each mixing chamber in substantially axial direction to be homogenized to an increasing extent during their passage through the serially arranged mixers.

---

The present invention relates to a method and apparatus for mixing flowable substances. More particularly, the invention relates to improvements in a method and apparatus for intimately mixing a liquid substance with a gaseous, liquid or comminuted solid substance which can be dissolved or absorbed in or reacts with the liquid substance. For example, the method and apparatus of my invention may be resorted to in neutralizing of liquids or waste gases in dipping or pickling plants, in the production of acids or salts, and for many analogous purposes.

It is already known to neutralize and to simultaneously scrub industrial gases by conveying the gases through towers in countercurrent arrangement with respect to water or another suitable liquid. The liquid trickles through interstices defined by fillers which are piled up in the interior of the tower, and the gas is caused to flow upwardly so that each of its zones is brought into intimate contact with liquid. Such towers are very expensive and occupy too much room.

It is also known to neutralize liquid substances in an agitating tank wherein the liquid to be neutralized is mixed with lime or another neutralizing agent. The mixing or stirring action is carried out by mechanical means and the resulting mixture is then admitted into reaction tanks where the neutralizing operation proceeds. The resulting neutralized liquid contains a liquid fraction and a solid fraction, and these fractions are thereupon separated from each other in conventional settling tanks. Such neutralizing apparatus, too, are quite bulky and involve exceptionally high initial and maintenance costs.

Accordingly, it is an important object of the present invention to provide a method of intimately mixing two or more flowable substances by resorting to very compact, relatively inexpensive and rugged apparatus and according to which two or more substances may be intimately mixed within exceptionally short periods of time.

Another object of the invention is to provide a method of the just outlined characteristics according to which two or more flowable substances may be mixed in any desired proportions, which may be resorted to in neutralizing of liquid and/or gaseous substances, and which is equally useful for scrubbing of gases, in the production of acids, and/or in the production of salts.

A further object of the invention is to provide a method of the above outlined character which may be resorted to with particular advantage in intimately mixing a liquid substance with a pulverulent, gaseous or liquid mass which is dissoluble in the liquid substance, which can be absorbed by the liquid substance, or which can react with the liquid substance.

An additional object of the invention is to provide a very simple, compact, rugged and inexpensive apparatus which may be used in practicing the above outlined method and which occupies much less room than a conventional mixing apparatus of the same capacity.

A concomitant object of the invention is to provide the improved mixing apparatus with novel mixers and blenders which insure that two or more flowable substances can be intimately mixed with a desired degree of intensity.

Still another object of the invention is to provide an apparatus whose component parts may be used for a variety of purposes, particularly for neutralization of liquids and/or gases and for the production of salts or acids, and whose operation may be controlled in a fully automatic way in accordance with a predetermined schedule to insure that the quality of the ultimate product invariably remains within a desired optimum range.

Briefly stated, one feature of my present invention resides in the provision of a method of intimately mixing a liquid substance (for example, water or acid) with a flowable (gaseous, liquid or comminuted solid) substance. In its elementary form, the method comprises conveying the substances simultaneously at very high speed along at least one substantially circular path but preferably along a series of successive circular paths each of which receives the substances substantially tangentially and from each of which the progressively homogenized mixture of such substances is discharged substantially axially, whereby the partially homogenized mixture issuing axially or centrally from a preceding circular path enters tangentially the next following circular path. In many instances, the two substances are preferably conveyed in the presence of a gaseous carrier for one or both substances, and such gaseous carrier may be compressed air.

If the liquid substance is an acid which is to be neutralized by the flowable substance, the method further comprises the steps of blending the liquid to be neutralized with the flowable substance prior to admission of such substances into the first circular path and in such proportions that the neutralization of mixture issuing from the last circular path is at least nearly completed whereby the neutralized mixture contains a liquid fraction and a solid fraction. The solid fraction may be allowed to settle from the liquid fraction, and the liquid fraction may be reused or it may be discharged into the sewage system or elsewhere.

In accordance with a more specific but highly advantageous feature of my invention, the liquid to be neutralized is subdivided into a plurality of smaller streams and metered quantities of the neutralizing agent are admitted to one such smaller stream. The smaller streams are then merged and the resulting mixture is admitted into the first circular path. The method may also comprise the step of measuring the pH value of the mixture issuing from the last circular path and regulating the admission of neutralizing agent into the one smaller stream in accordance with the result of such measurement so that the pH value of the mixture issuing from the last circular path remains within a preselected optimum range.

Alternatively, neutralization of the liquid substance by a flowable neutralizing agent may be carried out in such a way that a stream of liquid to be neutralized is subdivided into a pair of smaller streams and that each smaller stream receives neutralizing agent in such quantities that one of the smaller streams becomes a mild acid and the other stream becomes a mild alkali. The two smaller streams are then merged prior to admission of the resulting mixture into the first circular path. The acid and the alkali may be accumulated in separate tanks to form two bodies from which the contents are withdrawn in equal or unequal amounts to be mixed prior to admission into the first circular path.

If the liquid substance is a neutralizing agent for gases, a stream of neutralizing agent is subdivided into a plurality of high-speed jets and the gas to be neutralized is conveyed into the region of such jets so that it is sucked up by the neutralizing agent. The resulting mixture is then admitted into the first circular path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

Figure 1:
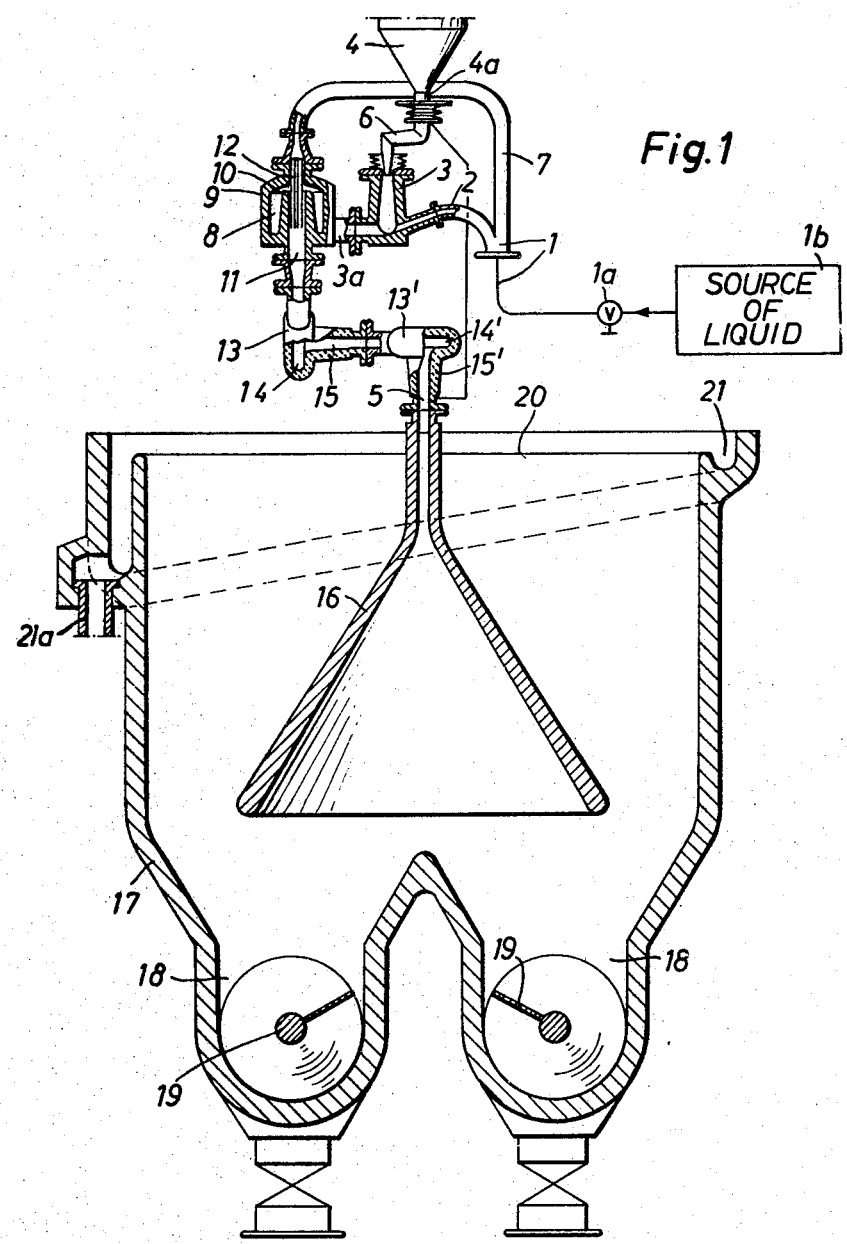
FIG. 1 is a somewhat diagrammatic partly elevational and partly sectional view of a first apparatus which embodies my invention and which may be utilized for neutralization of a liquid substance.

Referring first to FIG. 1, there is shown an apparatus which may be utilized for neutralization of liquids. The liquid to be neutralized is admitted at high speed from a source 1b through a supply conduit 1 which branches off into lines 2 and 7. The rate at which the liquid is fed through the conduit 1 is controlled by a suitable regulating valve 1a. One portion of the thus admitted liquid flows through the branch line 2 and enters, at high speed, the larger-diameter bottom zone of a substantially pear-shaped blending chamber defined by a primary mixer or blender 3. This blender 3 is connected with a source 4 of finely comminuted solid neutralizing agent. In the illustrated embodiment, the source 4 resembles a magazine or hopper which is located at a level above the primary blender 3 and whose outlet 4a is connected with a metering device 6 which is controlled by a testing or sampling electrode 5. The latter measures the pH value of the fully neutralized liquid and regulates the flow of neutralizing agent through the metering device 6 in such a way that the pH value remains within a prescribed range. The mixture of liquid and partially dissolved neutralizing agent which flows through the outlet in the bottom zone of the chamber in the blender 3 enters a secondary mixer or blender 9 which insures that the solution and suspension of the neutralizing agent in the liquid to be neutralized are more intimately mixed with each other. The internal chamber 8 of the secondary blender 9 is bounded at least in part by a helical surface and receives liquid with partially dissolved neutralizing agent in the bottom zone thereof so that the material entering tangentially via connecting conduit 3a rises and ultimately overflows into a vertical or nearly vertical outlet 10.

The second branch line 7 conveys the remaining portion of liquid to be neutralized and admits such liquid into the outlet 10 through a series of elongated tubular nozzles 12 which are distributed in such a way that each increment of partially neutralized liquid overflowing from the chamber 8 is intimately mixed with a given amount of untreated liquid which is admitted via branch line 7. In other words, the streamlets of untreated liquid which issue from the nozzles 12 are uniformly admixed to all zones of partially neutralized liquid which overflows into the outlet 10. The outlet 10 is connected with a connecting conduit 11 which admits the resulting mixture of partly neutralized and untreated liquid into a first main mixer 13. This mixer 13 is constructed in accordance with an important feature of the present invention and has a circular or annular mixing chamber 14 which receives the mixture from the conduit 11 in such a way that the mixture is admitted tangentially and is set in rotary motion to issue through an axially or centrally located outlet 15 which leads to the chamber 14' of a second main mixer 13' having a centrally or axially located outlet 15' which accommodates the testing electrode 5. At the time the liquid reaches the electrode 5, the neutralizing agent is completely dissolved therein so that the neutralization is completed and the electrode 5 can detect the actual pH value. The manner in which an electrode 5 can detect the pH value and is used to regulate a metering device is known per se and by itself forms no part of the present invention. Due to such neutralization, the liquid fraction of fully homogenized mixture carries a certain amount of sludge which must be separated and collected. Therefore, the apparatus further comprises an inverted funnel-shaped discharge pipe 16 wherein the velocity of discharged material decreases considerably so that the material accumulates without turbulence in a settling tank 17. The heavier sludge settles in grooves or channels 18 in the bottom zone of the tank 17 and is expelled by means of evacuating devices here shown as screw conveyors 19 which feed the thus discharged material into silos or other suitable storing devices, not shown. The liquid fraction which is now free of solid ingredients rises in the settling tank 17 and overflows at 20 to enter an inclined channel 21 on its way to the discharge opening 21a. If the liquid fraction is not reusable, it may be discharged into the public sewage system or is otherwise disposed of.

It was found that the streamlets of liquid substance which overflows into the outlet 10 of the blender 9 and the streamlets of liquid substance discharged through the tubular nozzles 12 into the outlet 10 form in the circular chamber 14 of the first main mixer 13 a mixture which spins about the axis of the mixer 13 whereby the streamlets of neutralizing agent are intimately admixed to liquid streamlets. The partially homogenized mixture issuing through the central outlet 15 of the first main mixer is fully homogenized in the chamber 14' of the second main mixer 13'. The outlets 15, 15' of the mixers 13, 13' resemble funnels and respectively converge in directions away from the mixing chambers 14, 14'. Each of these outlets 15, 15' has a smooth (preferably rounded) transition into the central zone of the respective mixing chamber. Each of the mixers 13, 13' preferably consists of suitable ceramic material; however, it is also possible to make such mixers of synthetic plastic, vitreous or metallic material.

The duration of the actual mixing operation may be selected at will, for example, by regulating the rate of admission of liquid substance through the supply conduit 1 and/or by assembling the main mixer 13, 13' in series with one or more additional main mixers. The number of main mixers will determine not only the quality of neutralizing action but also the overall time needed to complete the mixing operation.

The blenders 3 and 8 assist the main mixers in bringing about a highly satisfactory neutralizing action by insuring that particles of liquid admitted at 1 surround and coat particles of neutralizing agent at the time such neutralizing agent enters the tangential inlet of the first main mixer 13. It is clear that the blender 9 may be provided with two or more tangential inlets which discharge two or more different flowable substances into the blending chamber 8. Since the material admitted tangentially into the chamber 8 via conduit 3a rotates about the outlet 10, the specifically heavier particles travel radially outwardly and the lighter particles travel toward the external surface of the outlet 10 so that the blender 9 by itself brings about an exceptionally thorough mixing or blending action. The mixing action is then completed in the main mixers 13 and 13'. The currents developing in the chambers 14, 14' of the mixers 13, 13' resemble annuli or short tubes with hollow cores and each such current is built up and collapses repeatedly to thereby insure a highly satisfactory mixing action.

The optimum speed at which the mixture of two or more flowable substances is sucked or pressed through a series of interconnected annular paths defined by the main mixers depends to a certain degree on the nature of flowable substances and may be determined empirically. If the apparatus of the present invention comprises a large number of successive main mixers, if preferably comprises one or more pumps which convey the flowable substances at a desired speed. Centrifugal, vane type or other suitable pumps may be used with equal advantage. Such pumps are shown in FIGS. 2–4.

The diameter of each mixing chamber 14, 14' may exceed about five times the diameter of the tangential inlet to the respective main mixer.

Figure 2:
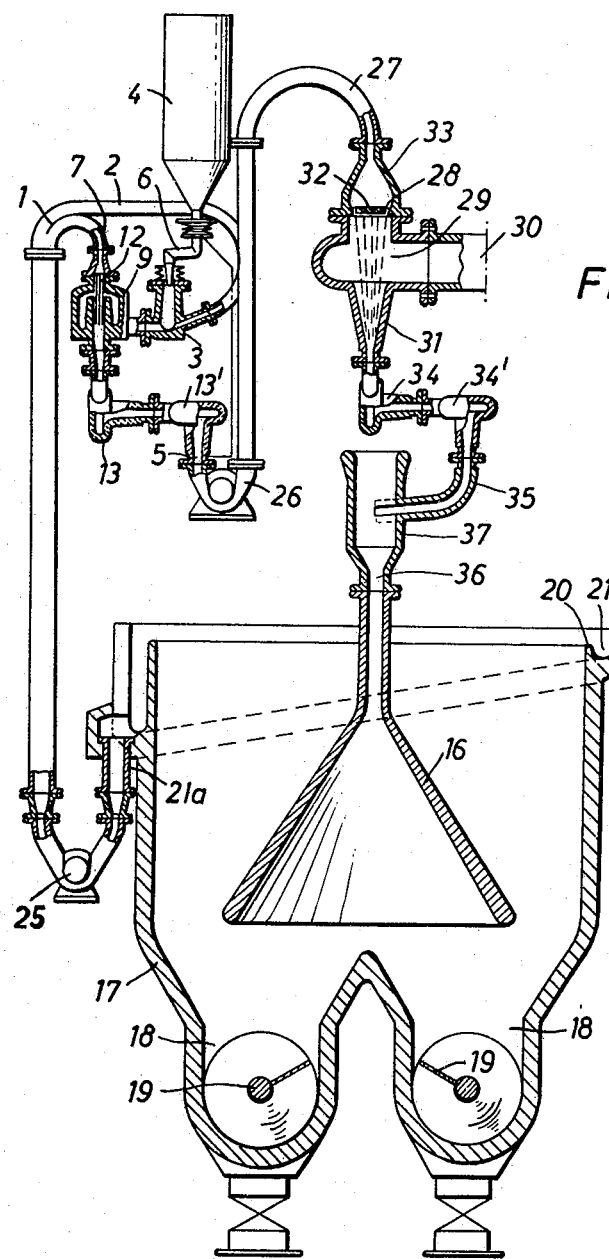
FIG. 2 is a similar partly elevational and partly sectional view of a modified apparatus which may be utilized for neutralization and scrubbing of industrial gases.

FIG. 2 illustrates a modified apparatus which may be utilized for scrubbing and for neutralization of industrial waste gases. Certain components of this second apparatus are identical with and are denoted by the same numerals as the corresponding components of the apparatus shown in FIG. 1. The intake of the supply conduit 1 shown in FIG. 2 is connected with the pressure side of a pump 25 which receives neutralized liquid (e.g., water) from the discharge opening 21a of the settling tank 17 and conveys such liquid at elevated pressure into both branch lines 2 and 7 of the conduit 1. The branch line 2 again discharges into a primary blender 3 whose pear-shaped chamber receives metered quantities of a soluble neutralizing agent for waste gas. Such agent is stored in the hopper 4 and is discharged through a metering device 6 which is controlled by a testing or sampling electrode 5 located downstream of the second main mixer 13'. The liquid (hereinafter called water) with partially dissolved neutralizing agent issuing from the blender 3 and pure water flowing through the branch line 7 are mixed in the secondary blender 9 and the resulting mixture enters first the main mixer 13 and then the second main mixer 13' so that the dissolution of neutralizing agent for gas in water is completed when the mixture reaches the electrode 5. Such mixture is then conveyed by a pump 26 to flow at high velocity through a conduit 27 and to enter a scrubbing or dust separator unit having a diverging bell-shaped inlet 33 located upstream of a plate-like nozzle or sieve 32 provided with a plurality of orifices 28. This scrubbing unit is actually an aspirator pump. The jets of water issuing from the orifices 28 suck waste gas which is admitted via feed conduit 30 and enters a dust separator chamber 29 downstream of the nozzle 32. The thus admitted waste gas is sucked into a converging conical outlet 31 and enters tangentially into the circular or annular chamber of a further main mixer 34 and corresponding to the mixer 13 or 13'. The centrally located outlet of the mixer 34 discharges tangentially into an additional main mixer 34' whose centrally located outlet discharges into a conduit 35 leading into a gas take-off pot 37. In order to enhance suction in the chamber 29, the latter may accommodate suitable mixer nozzles which are not shown in the drawing. Once the mixture of water and waste gases enters the conduit 35, the gases are relieved of dust and are sufficiently neutralized to be ready for discharge into the atmosphere through the open top of the pot 37. The outlet 36 of the pot 37 conveys the liquid fraction which contains dust into the diverging discharge pipe 16 so that the liquid fraction enters the tank 17 where the solid ingredient settles in grooves 18 and is evacuated by conveyors 19. The remainder is pure water which overflows at 20 and enters the channel 21 to be admitted to the suction side of the pump 25. In other words, the body of water circulates through the closed system of the apparatus shown in FIG. 2 to be reused as often as desired. The gaseous ingredient enters at 30 and is evacuated at 37. The sludge which settles in the grooves 18 of the tank 17 contains dust and all such solid matter which is produced in response to neutralization of gases, mainly crystallized salt. The velocity of water which rises in the tank 17 decreases gradually, and such water is accelerated again when it enters the pump 25 so that the conduit 1 conveys a stream of water which flows at high velocity.

Figure 3:
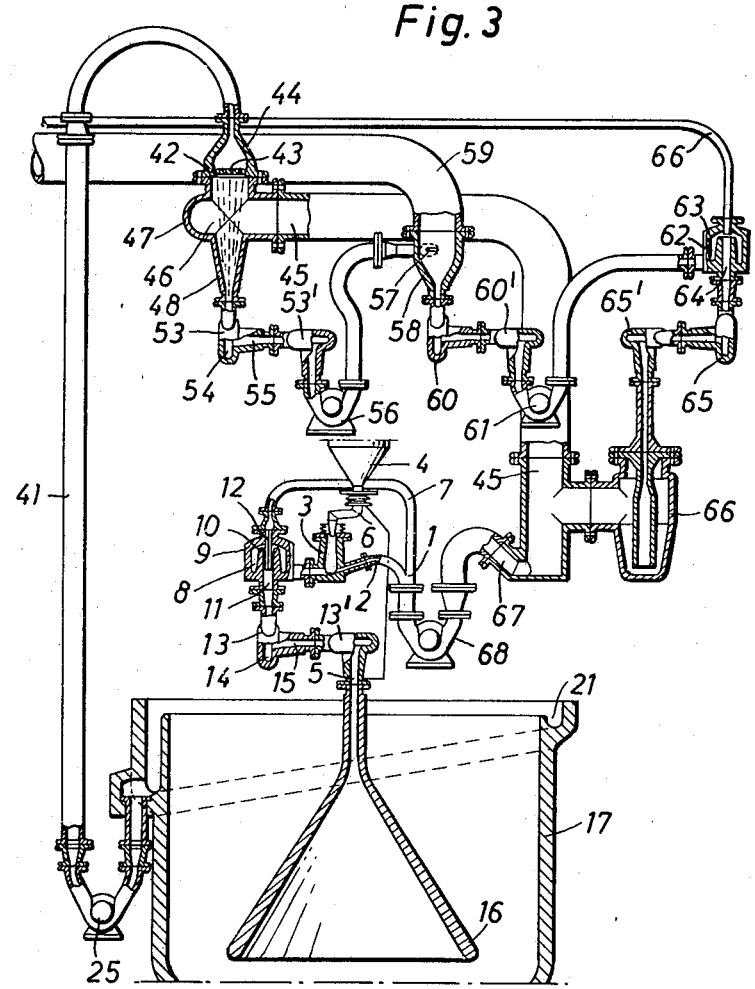
FIG. 3 is a partly elevational and partly sectional view of an apparatus which may be utilized for the production of salts.
Figure 4:
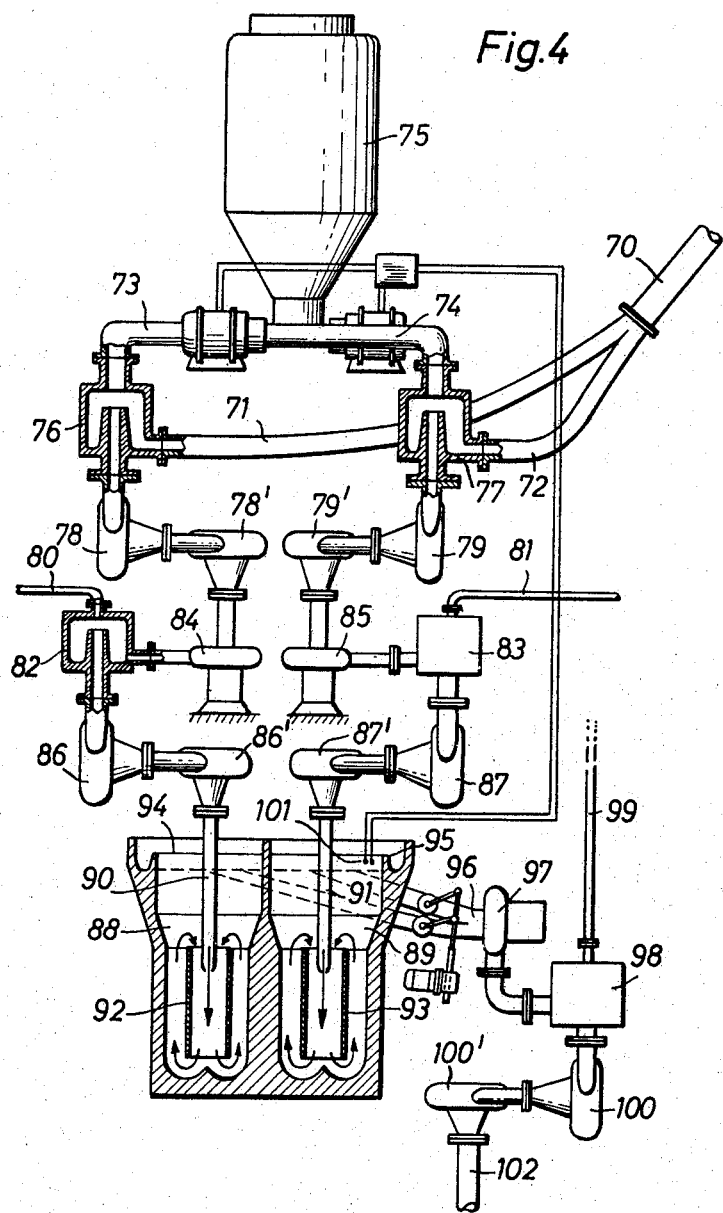
FIG. 4 is a partly elevational and partly sectional view of a fourth apparatus which may be utilized for neutralization of liquids.

FIG. 3 illustrates an apparatus for the production of salts. This apparatus comprises an acid producing unit and a neutralizing unit which latter is identical with the apparatus of FIG. 1. The pump 25 conveys water which overflows from the settling tank 17 and conveys it through a conduit 41 so that the water flows at high speed and enters a bell-shaped inlet 44 whose bottom portion contains a nozzle or sieve 43 provided with orifices 42. The jets of water issuing at high speed from the orifices 42 suck an acid gas which is admitted via feed conduit 45 and enters the chamber 46 in a housing 47. The gas admitted through the feed conduit 45 may be $SO_3$, $NO_2$, $HCl$ or another acid gas. The two fluids then flow through a converging conical outlet 48 and enter a first main mixer 53 whose circular or annular chamber 54 has an axially extending outlet 55 leading into the chamber of a second main mixer 53'. The centrally located outlet of the mixer 53' discharges into a pump 56 which conveys the resulting homogeneous mixture to one or more nozzles 57 discharging tangentially into a conical vessel 58. The mixers 53, 53' bring about absorption of gas in water so that the substance entering the vessel 58 is a low-concentration acid. The upper end portion of the vessel 58 is connected with a pressure line 59 which admits acid gas at elevated pressure so that such gas mixes with the low-concentration acid supplied by the pump 56. The mixing action is completed in the main mixers 60, 60' which are arranged seriatim downstream of the vessel 58 so that the acid reaching a pump 61 has a concentration of about 50 percent. The pump 61 conveys such acid to the helically configurated chamber 62 of a blender 63 wherein the acid rises in the chamber 62 and overflows into the outlet 64. This outlet 64 conveys the acid to the first of two serially arranged main mixers 65, 65' and simultaneously receives acid gas through a pressure line 66 which discharges into the blender 63. The line 66 admits acid gas at such a pressure and at such a speed that the substance issuing from the axially extending outlet of the mixer 65' is an acid of desired concentration with a surplus of acid gas which is separated from acid in a separator 66. The outlet of the separator 66 is connected with the feed conduit 45 which delivers surplus gas to the chamber 46. The highly concentrated acid descends in the feed conduit 45 and flows into an outlet 67 connected with a pump 68 which conveys the acid into the supply conduit 1. Instead of being admitted to the suction side of the pump 68, the highly concentrated acid can be tapped off for storage in a suitable tank or the like, not shown.

In the embodiment of FIG. 3, the acid conveyed by the pump 68 is mixed with neutralizing agent which is admitted in measured quantities by the metering device 6 in the same way as described in connection with FIG. 1. The salt descends into the grooves at the bottom of the settling tank 17 and is evacuated by the conveyor screws 19 shown in FIG. 1. The water overflows into the channel 21 and is recirculated by the pump 25.

FIG. 4 illustrates an apparatus for neutralization of liquids. The liquid to be neutralized is admitted through a supply conduit 70 and is divided into two substantially equal smaller streams while flowing through branch lines 71, 72. Each of these smaller streams receives metered quantities of a neutralizing agent which is stored in a hopper 75 and is introduced into the lines 71, 72 by metering devices 73, 74. Each of these metering devices comprises a feed screw which is driven by an infinitely variable motor in such a way that the rate of admission into the line 71 is independent from the rate of admission into the line 72. For example, the hopper 75 may contain a supply of lime. The line 71 receives lime in such quantities that the pH value of liquid flowing therethrough is different from the pH value of liquid which flows through the line 72. For example, the admission of lime into the line 71 will render the liquid slightly acidic whereas the liquid in the line 72 (upon admission of lime by the metering device 74) will be slightly alkaline. Mixing of the two liquid streams with the agent admitted by the metering devices 73, 74 respectively takes place in blenders 76, 77 which are constructed in the same way as the blender 9 of FIG. 1. The final mixing takes place in the presence of a gas, preferably compressed air. The mixture formed in the blender 76 is then admitted tangentially into a first main mixer 78 and through the axially located outlet of the mixer 78 into a second mixer 78′. Analogously, the mixture formed in the blender 77 is admitted into two serially connected main mixers 79, 79′.

Compressed air is admitted through lines 80, 81 which discharge into blenders 82, 83 corresponding to the blender 9 of FIG. 1. These blenders receive liquid fractions from pumps 84, 85 which are respectively connected with the axially extending outlets of the main mixers 78′, 79′. The pumps 84, 85 impart to the liquid fractions the necessary speed and the mixtures of liquid and gas formed in the blenders 82, 83 are then admitted tangentially into main mixers 86, 87 and thence to associated main mixers 86′, 87′. The pump 84 is an acid pump.

The homogeneous mixtures issuing from the mixers 86′, 87′ are conveyed through pipes 90, 91 and enter tanks 88, 89. The pipes 90, 91 extend well into the bottom zones of the tanks 88, 89 and discharge into open-ended vertical cylinders 92, 93. Since the bottom ends of the cylinders 92, 93 are open, and since the pipes 90, 91 respectively admit slightly acidic and slightly alkaline liquids at high velocity, such liquids expel the liquids which are contained in the cylinders 93, 93 whereby the thus expelled liquids overflow into the open upper ends of the respective cylinders. In other words, the liquids admitted through the pipes 90, 91 effect a continuous circulation of the liquid bodies in the tanks 88, 89 to insure that such liquid bodies are intimately mixed with the inflowing liquids. This prevents fluctuations in the pH value of liquid bodies in the tanks 88, 89.

The solution in the tank 88 may have a pH value of 6.5 and the solution in the tank 89 may have a pH value of 7.5. These solutions respectively overflow into the channels 94, 95 which communicate with each other and discharge into a conduit 96 leading to the suction side of a pump 97 which forces the resulting mixture into a blender 98 corresponding to the blender 9 of FIG. 1. The mixture in the blender 98 is oxidized by admission of compressed air through a pressure line 99 and the blender 98 discharges tangentially into a main mixer 100 which is followed by a main mixer 100′, the latter's outlet 102 discharging the neutralized liquid into a settling tank corresponding to the tank 17 shown in FIG. 1.

A very important advantage of the apparatus shown in FIG. 4 is that it may be produced at a reasonable cost and occupies little room. Also, the control system which regulates the operation of its components is very simple and compact. Furthermore, this apparatus will bring about highly satisfactory neutralization of liquid despite the fact that the pH value of liquids which are admitted through the supply conduit 70 might fluctuate within a wide range.

The upper portion of the tank 89 accommodates a testing or sampling electrode 101 which is adjacent to the overflow channel 95. This electrode 101 determines the pH value of slightly alkaline liquid in the tank 89 and controls the operation of the metering devices 73, 74.

The metering action for the alkaline stream in the branch line 72 takes place in such a way that the metering device 74 supplies lime at a maximum rate when the pH value in the tank 89 equals or approximates 7. As the alkalinity of liquid in the tank 89 rises above the value 7, the metering device 74 begins to supply lime at a reduced rate and ceases to deliver lime when the pH value in the tank 89 rises to 8. The operate of the metering device 73 is dependent on the operation of the device 74, preferably in such a way that the device 73 starts to supply lime when the device 74 operates at least at 10 percent of capacity. The rate at which the device 73 supplies lime into the branch line 71 (and more particularly into the blender 76) increases linearly with decreasing alkalinity of liquid in contact with the electrode 101 and, when the pH value in the tank 89 is 7, the device 73 and the device 74 will operate at capacity, i.e., each of these devices then admits maximum amount of neutralizing agent. The branch line 72 receives more neutralizing agent than the line 71. The amounts of lime admitted by the metering device 74 are related to amounts of lime admitted by the metering device 73 in the following way:

| | | | | | |
|---|---|---|---|---|---|
| Capacity of metering device 73 | 0% | 22% | 44.3% | 77.5% | 100% |
| Capacity of metering device 74 | 10% | 30% | 50% | 80% | 100% |

The pH of liquids overflowing from the tanks 88, 89 is such that these liquids invariably neutralize each other not later than at the time they reach the outlet 102 and the settling tank which receives neutralized liquid from the mixer 100′.

If it is desired to achieve an exceptionally high degree of neutralization, the overflow channels 94, 95 may be connected to the suction side of the pump 97 by separate conduits and such conduits may be provided with suitable regulating valves which are controlled by pH detectors installed in the tanks 88, 89. In this way, the pump 97 will invariably receive a mixture of slightly alkaline liquid with slightly acidic liquid which guarantees complete neutralization not later than in the second main mixer 100′. The sum of cross-sectional areas of the aforementioned regulating valves is always the same. It is also possible to replace such regulating valves by a single mixer valve which may be controlled by electrodes dipping into the tanks 88, 89 or by a single electrode installed in the outlet 102 or in the settling tank which receives neutralized liquid from the outlet 102.

The streams of compressed air which are admitted through the pressure lines 80, 81 and 99 enhance the mixing effect and, if necessary, bring about oxidation of the mixture which is supplied by the pump 97. The streams of compressed air may serve as the sole carrier or as an additional carrier for the mixture admitted to the chamber of the blender 82, 83 or 98.

Without further analysis, the foregoing will so fully reveal the gist of the present invention that others can, by applying current knowledge, readily adapt it for various applications without omitting features which fairly constitute essentially characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for intimately mixing a liquid substance with a flowable substance, comprising a plurality of serially arranged mixers each having a substantially circular mixing chamber, an inlet discharging substantially tangentially into and an outlet located substantially axially of the respective mixing chamber; and means for conveying the substances simultaneously through each of said mixers at high velocity whereby the partially homogenized mixture issuing axially from the mixing chamber of a preceding mixer is admitted tangentially into the mixing chamber of the next following mixer.

2. An apparatus as set forth in claim 1, wherein at least one of said mixers consists of ceramic material.

3. An apparatus as set forth in claim 1, wherein at least one of said outlets resembles a funnel converging in a direction away from and having a gradual transition into the mixing chamber of the respective mixer.

4. An apparatus as set forth in claim 1, wherein the diameter of each said mixing chambers is a multiple of the diameter of the respective inlet.

5. An apparatus as set forth in claim 4, wherein the diameter of each mixing chamber approximates five times the diameter of the respective inlet.

6. An apparatus as set forth in claim 1, further comprising a blender located upstream of said mixers, said blender having a blending chamber provided with a substantially tangential inlet for one of said substances and a second inlet for the other substance, and an outlet having an intake end positioned to receive the mixture of substances in said blending chamber above a predetermined level, said last named outlet being connected with the inlet of the first mixer.

7. An apparatus as set forth in claim 6, wherein the other inlet of said blender is coaxial with the outlet of said blender.

8. An apparatus as set forth in claim 7, wherein said blending chamber is of annular shape and surrounds the outlet of said blender.

9. An apparatus as set forth in claim 8, wherein at least one side of said blending chamber is bounded by a helically configurated surface.

10. An apparatus as set forth in claim 7, wherein the inlet of said blender comprises a plurality of uniformly distributed tubular nozzles extending into the outlet of said blender.

11. An apparatus as set forth in claim 1, wherein said flowable substance is a gas and further comprising an aspirator pump located upstream of and having an outlet connected with the inlet of the first mixer, said pump comprising first conduit means for admitting the gas and second conduit means for admitting the liquid substance in the form of high-speed jets which suck up the admitted gas and convey such gas into the outlet of said pump.

12. An apparatus as set forth in claim 11, wherein the means for conveying the substances comprises a further pump located intermediate said aspirator pump and said mixers.

References Cited

UNITED STATES PATENTS 3,072,465  1/1963  Akaboshi et al. ____ 23—285 XR
3,081,256  3/1963  Hendal et al. _____ 23—285 XR MORRIS O. WOLK, Primary Examiner M. D. BURNS, Assistant Examiner U.S. Cl. X.R.

23—267